United States Patent [19]

Soma et al.

[11] Patent Number: 5,445,902
[45] Date of Patent: Aug. 29, 1995

[54] METHOD FOR OPERATING A POWER GENERATOR

[75] Inventors: Takao Soma, Nishikamo; Tomonori Takahashi, Chita; Shinji Kawasaki, Nagoya; Katsuki Yoshioka, Himeji, all of Japan

[73] Assignee: NGK Insulators, Ltd., Japan

[21] Appl. No.: 133,872

[22] Filed: Oct. 12, 1993

[30] Foreign Application Priority Data

Oct. 14, 1992 [JP] Japan ................................. 4-275952

[51] Int. Cl.$^6$ ............................................. H01M 8/02
[52] U.S. Cl. ........................................ 429/30; 429/26; 429/31; 429/32; 429/33; 429/34; 29/623.1
[58] Field of Search .................... 429/30, 26, 31, 33, 429/32, 34; 29/623.1

[56] References Cited

U.S. PATENT DOCUMENTS

| | | | |
|---|---|---|---|
| 4,686,158 | 8/1987 | Nishi et al. | 429/26 |
| 4,799,936 | 1/1989 | Riley | 29/623.1 |
| 4,950,562 | 8/1990 | Yoshida et al. | 429/32 |

FOREIGN PATENT DOCUMENTS

| | | |
|---|---|---|
| 0338823 | 10/1989 | European Pat. Off. |
| 0469831 | 2/1992 | European Pat. Off. |

OTHER PUBLICATIONS

Journal Of The Electrochemical Society, vol. 136, No. 9, 9 Sep. 1989, Manchester, New Hampshire, U.S., pp. 2604–2606, Toshihiko Yoshida et al., "Properties of Partially Stabilized Zirconia Fuel Cell".
Proceedings Electrochemical Society (First International Symposium On Solid Oxide Fueld Cells, vol. 89, No. 11, 1989, Pennington, pp. 214–219, A Belzner et al. "Measurement of the Chemical Diffusion Coefficient of Oxygen In (LaO, 79SrO, 20)MnO3". (Month N/A).
Solid State Ionics, vol. 35, No. 3–4, 1989, Amsterdam NL, pp. 263–268, Kikuji Tsuneyoshi et al. "Kinetic Studies on the Reaction at the LaO, 6CaO, 4MnO3/YSZ Interface, as an SOFC Air Electrode". (Month N/A).

*Primary Examiner*—Prince Willis, Jr.
*Assistant Examiner*—M. Nuzzolillo
*Attorney, Agent, or Firm*—Parkhurst, Wendel & Rossi

[57] ABSTRACT

A method for operating a power generator in which a solid oxide fuel cell is used as a power-generating element and an air electrode of the solid oxide fuel cell is composed of lanthanum manganite, the method involving the step of setting a heating rate and a cooling rate at least in a temperature range of 800° C. to 900° C. at not less than 3° C./min. when the fuel cell is heated up to an operating temperature at the time of starting the power generator and when the fuel cell is cooled from the operating temperature at the time of stopping the power generator. Alternatively, the method involves the step of setting a partial pressure of oxygen, at least in a temperature range of 800° C. to 900° C., in an atmosphere to which the air electrode is exposed, to at not less than $10^{-15}$ arms but not more than $10^{-1}$ arms when the fuel cell is heated up to an operating temperature at the time of starting the power generator and when the fuel cell is cooled from the operating temperature at the time of stopping the power generator.

9 Claims, No Drawings

METHOD FOR OPERATING A POWER GENERATOR

BACKGROUND OF THE INVENTION

1. Field of the Invention

The present invention relates to a method for operating a power generator using solid oxide fuel cells as power-generating elements.

2. Related Art Statement

Since the solid oxide fuel cells ("SOFC"s) operate at a high temperature of around 1,000° C., an electrode reaction is extremely active, and the SOFCs need no noble metal catalyst such as platinum. Further, their polarization is low, and output voltage is relatively high. Thus, an energy-converting efficiency is far greater as compared with other fuel cells. In addition, since all the constituent materials are solid, the solid oxide fuel cell is stable and has a long life.

In order to develop SOFCs, it is important to look for materials stable at high temperatures. As a material for the air electrodes of the SOFC, sintered bodies of lanthanum manganite are considered promising (Energy General Engineering, 13, 2, pp 52-68, 1990). As such lanthanum manganite sintered bodies of the SOFC, lanthanum manganite sintered bodies having a substantially stoichiometrical composition and lanthanum manganite sintered bodies in which a part of A-sites (lanthanum sites) are missing (manganese-rich composition) are known. It is reported that the weight of lanthanum manganite sintered body in which a part of the A-sites are missing decreases when the temperature raises from room temperature to 1,000° C. (J. Electrochem. Soc. 138, 5, pp 1,519 to 1,523, 1991). In this case, the weight of the sintered body begins to decrease from near 800° C.

In particular, porous sintered bodies composed of lanthanum manganite doped with Ca or Sr at A-sites are regarded as promising as materials for air electrodes involving self-supporting type air electrode tubes.

SUMMARY OF THE INVENTION

However, the present inventors first found out that such porous sintered bodies have the following problems.

That is, when the above SOFC is subjected to heating-cooling cycling between a temperature range of 900° C. to 1,100° C. at which the SOFC generates electric power and a temperature range of room temperature to 600° C., cracking occurs between the air electrode tube made of the above porous sintered body and other constituent materials of a cell unit, which may result in fracture of the cell unit.

However, even when such a cell unit is operated at 1,000° C. for a long time, the above cracking did not occur at all. Therefore, it is considered that this phenomenon is caused not by shrinkage of the porous sintered body during the above firing but by the dimensional change during the heat cycling.

It is an object of the present invention to afford stability against the above heat cycling upon the air electrode.

The present invention relates to a method for operating a power generator in which a solid oxide fuel cell is used as a power-generating element and an air electrode of said solid oxide fuel cell is composed of lanthanum manganite, said method comprising the step of setting a heating rate and a cooling rate at least in the temperature range of 800° C. to 900° C. at not less than 3° C./min. when the fuel cell is heated up to an operating temperature at the time of starting the power generator and when the fuel cell is cooled from the operating temperature at the time of stopping the power generator.

The invention further relates to a method for operating a power generator in which a solid oxide fuel cell is used as a power-generating element and an air electrode of said solid oxide fuel cell is composed of lanthanum manganite, said method comprising the step of setting the partial pressure of oxygen, at least in a temperature range of 800° C. to 900° C., in an atmosphere to which said air electrode is exposed at not less than $10^{-15}$ atms but not more than $10^{-1}$ atms when the fuel cell is heated up to an operating temperature at the time of starting the power generator and when the fuel cell is cooled from the operating temperature at the time of stopping the power generator.

The present inventors subjected porous sintered bodies made of lanthanum manganite doped with Ca, Sr or the like at A-sites to heating/cooling cycles between 900° C. and 1,100° C. and between room temperature and 600° C., and examined their stability. As a result, it was found out that the above porous sintered body is shrunk in an amount of about 0.01 to about 0.1% per one heat cycle. In addition, it was found out that the shrinkage of the porous sintered body in the heat cycling is not converged even by the heat cycles at 100 times, and that the porous sintered body is shrunk by a few or several percentages in the heat cycling at 100 times. If the air electrode is shrunk like this, cracking occurs between the air electrode and other constituent materials of the cell unit, which may cause fracture of the cell unit.

The above mechanism is unclear at present. However, it is presumed that oxygen comes in or out of crystals of lanthanum manganite in air in the temperature range of 800° C. or more in the heat cycling, thereby causing distortion of crystalline lattices and promoting material transfer of metallic atoms.

Further, the present inventors have advanced their research based on this knowledge, and consequently they discovered that there is a clear correlationship between the dimensional shrinkage of the air electrode and exchange of oxygen between lanthanum manganite and the atmosphere (gas phase) in the heat cycling.

The present inventors confirmed that the above exchange of oxygen occurs in the temperature range between 800° C. and 900° C., and the inventors have succeeded in suppressing dimensional shrinkage of the air electrode in the heat cycling by restraining the transfer of the material in lanthanum manganite through increasing the heating rate on starting and the cooling rate on stopping, at least in the temperature range of 800° C. to 900° C.

More specifically, for this purpose, it is effective to set the heating rate and the cooling rate at not less than 3° C./min. If the heating rate or the cooling rate is less than 3° C./min., the effect of suppressing the dimensional shrinkage in the heat cycling is not conspicuous. In this sense, the heating rate and the cooling rate are preferably set at not less than 12° C./min. In this connection, it is impractical under consideration of a large heat capacity of an actual system to set the heating rate and the cooling rate at more than 15° C./min. Further, it is preferable that the heating rate and the cooling rate are set at not less than 3° C./min. and not more than 15° C./min in the temperature range of 700° C. to 900° C., and it is more preferable that the heating rate and the cooling rate are set at not less than 3° C./min. and not more than 15° C./min in the temperature range of 600° C. to 1,000° C..

The heating rate may be adjusted by preliminarily heating an oxidative gas to be introduced into an oxidative gas flow path. The cooling rate may be adjusted by increasing the flow rate of the oxidative gas to be introduced into the oxidative gas flow path or by introducing a cooling gas into the oxidative gas flow path.

Furthermore, the present inventors have succeeded in preventing the dimensional shrinkage of the porous sintered body in the heat cycling by suppressing absorption of oxygen into the porous sintered body by lowering the partial pressure of oxygen, at least in the temperature range of 800° C. to 900° C., in the atmosphere to which the air electrode is exposed. More specifically, if the above partial pressure of oxygen is more than $10^{-1}$ atm, an effect of suppressing the dimensional shrinkage of the porous sintered body is not conspicuous. In this sense, it is more preferable that the above partial pressure of oxygen is set at not more than $5 \times 10^{-2}$ atm. If the above partial pressure of oxygen is less than $10^{-15}$ atm, there is a fear that lanthanum manganite is decomposed. From the standpoint of stability of lanthanum manganite, the above partial pressure of oxygen is preferably not less than $10^{-5}$ atm. Further, it is more preferable that the above partial pressure of oxygen is not more than $10^{-1}$ atm and not less than $10^{-15}$ atm in the temperature range of 700° C. to 900° C., and it is much more preferable that the partial pressure of oxygen is not more than $10^{-1}$ atm and not less than $10^{-5}$ atm in the temperature range of 600° C. to 1,000° C.

To set the heating rate and the cooling rate at not less than 3° C./min. and the partial pressure of oxygen at not more than $10^{-1}$ atm and not less than $10^{-15}$ atom independently act upon lanthanum manganite, and both exhibit the same effect of suppressing coming-in and -out of oxygen at the electrode. Therefore, when the above two measures are combined together, the dimensional shrinkage of the air electrode can be more effectively suppressed.

The air electrode of the SOFC to which the present invention is applicable includes a self-supporting type air electrode also functioning as a substrate and a filmy air electrode. Such an air electrode substrate is used as a mother material of a cell unit, and constituent parts such as a solid electrolyte film, a fuel electrode film, an interconnector, separator, etc. are laminated upon the air electrode substrate. In this case, the air electrode substrate may be shaped in a cylindrical form with opposite ends opened, a bottomed cylindrical form with one end opened and the other closed, a planar form, or other form. Among them, the cylindrical form is particularly preferred, because thermal stress is difficult to act and gas-sealing is easily effected.

The term "lanthanum manganite" used in the specification and the claims means a perovskite type crystal in which A-sites are lanthanum and B-sites are manganese, and includes a perovskite type crystal in which a part of A-sites and/or B-sites are substituted by another element or other elements. An element or elements substituting a part of the A-sites may be preferably selected from the group consisting of alkaline earth elements and rare earth elements. Such elements are scandium, yttrium, cerium, praseodymium, neodymium, prometium, samarium, europium, gadolinium, terbium, dysprosium, holmium, erbium, thulium, ytteribium, lutetium, calcium, strontium, barium, and radium.

The coefficient of thermal expansion of the air electrode must be set to near those of a solid electrolyte film and a fuel electrode film. When the solid electrolyte film is made of yttria-stabilized zirconia, in order to match the thermal expansion between the air electrode and the solid electrolyte film, the substituting amount of calcium at the A-sites of lanthanum manganite is preferably 10% to 20% or the substituting amount of strontium at the A-sites is preferably 5% to 15%. In this case, when the present invention is employed, the thermal expansion of the air electrode can not only be matched with that of the solid electrolyte, but also the dimensional shrinkage of the air electrode in the heat cycling can be suppressed.

Furthermore, when the substituting amount of calcium at the A-sites of lanthanum manganite is set at 25% to 35% or when the substituting amount of strontium at the A-sites is set at 20% to 30%, the dimensional shrinkage of the air electrode in the heat cycling can be suppressed. In addition, when 0.02% to 20% of the B-sites are substituted by a metal selected from the group consisting of cobalt, magnesium, aluminum and nickel, the dimensional shrinkage of the air electrode in the heat cycling can be also suppressed. The above compositions may be combined with the operation method of the present invention. However, in this case, there is fear that difference in the thermal expansion between the solid electrolyte film made of yttria-stabilized zirconia and the air electrode may become larger, which is disadvantageous against the SOFC.

According to the present invention, presence of impurities inevitably entering in lanthanum manganite during the production of the lanthanum manganite and remaining in crystals or grain boundaries may be acceptable.

These and other objects, features and advantages of the invention will be appreciated upon reading of the following description of the invention, with the understanding that some modifications, variations and changes of the same could be made by the skilled person in the art to which the invention pertains without departing from the spirit of the invention or the scope of claims appended hereto.

DETAILED DESCRIPTION OF THE INVENTION

The present invention will be explained more concretely with reference to Examples and Comparative Examples.

EXPERIMENT 1

As starting materials, $La_2O_3$, $Mn_3O_4$, and $SrCO_3$ powders were used. In each sample, given amounts of starting materials were measured to afford a composition of $La_{0.9}Sr_{0.1}MnO_3$, and mixed together. The resulting mixed powder was molded under a pressure of 1 tf/cm² by cold isostatic pressing, thereby producing a molding. The molding was thermally treated at 1,500° C. for 10 hours in air, thereby synthesizing lanthanum manganite in which a part of A-sites were substituted by strontium. The synthesized product was milled in a ball mill, thereby preparing lanthanum manganite powder having the average particle diameter of about 5 μm. Then, polyvinyl alcohol was dispersed as an organic binder into the lanthanum manganite powder, which was molded into a rectangular plate by uniaxially pressing. The resulting molding was fired at 1,550° C. for 5 hours in air, thereby obtaining a sintered body. Porosity of the resulting sintered body was measured to be 34% by a water-replacing process. This porosity is sufficient for a material to be used for an air electrode.

Next, a plurality of rectangular rods each having the size: a longitudinal side of 3mm, a lateral side of 4mm and a length of 40 mm were cut as experimental samples from the sintered body. Each sample was subjected to heat cycling between 200° C. and 1,000° C. at three times. In each sample, the heating rate and the cooling rate were set at 1° C./min.(Sample 1-1), 2° C./min.-(Sample 1-2), 3° C./min.(Sample 1-3), 7° C./min.(Sample 1-4), 10° C./min.(Sample 1-5), 12° C./min.(Sample 1-6), or 15° C./min.(Sample 1-7). In each heat cycling, the sample was kept at a constant temperature of each of 200° C. and 1,000° C. for 30 minutes. The dimension of each experimental sample was measured by a micrometer before and after the above heat cycling, and a dimensional shrinkage rate after the heat cycling was calculated. Results are shown in Table 1.

TABLE 1

| Sample No. | Heating rate & cooling rate (°C./min.) | Dimensional shrinkage rate (%/three times heat cycles) |
| --- | --- | --- |
| 1-1 | 1 | 0.15 |
| 1-2 | 2 | 0.11 |
| 1-3 | 3 | 0.07 |
| 1-4 | 7 | 0.05 |
| 1-5 | 10 | 0.04 |
| 1-6 | 12 | 0.02 |
| 1-7 | 15 | 0.01 |

In Table 1, as compared with Samples 1-1 and 1-2 falling outside the scope of the present invention, the dimensional shrinkage rate is more conspicuously reduced in the case of Samples 1-3 through 1-7 according to the present invention. Particularly, in Samples 1-6 and 1-7 in which the heating rate and the cooling rate were not less than 12° C./min., the dimensional shrinkage rate per one heat cycle was less than 0.01%.

EXPERIMENT 2

Next, the temperature range in which the effect aimed at by the present invention can be exhibited was examined.

Same samples as used in Experiment 1 were employed, and subjected to the same heat cycling as in Experiment 1. The dimensional shrinkage rate of each sample after the heat cycling was calculated. In each sample, the heating rate and the cooling rate were varied as shown in Table 2. Results are shown in Table 2.

TABLE 2

| Sample No. | Heating rate & cooling rate (°C./min.) | Temperature range (°C.~°C.) | Dimensional shrinkage rate (%/three times heat cycles) |
| --- | --- | --- | --- |
| 2-1 | 12 | 200~600 | 0.15 |
|  | 1 | 600~1000 |  |
| 2-2 | 1 | 200~600 | 0.02 |
|  | 12 | 600~1000 |  |

As is clear from Table 2, it is more preferable in the present invention that the heating rate and the cooling rate are set at not less than 3° C./min. in the temperature range of 600° C. to 1,000° C.

EXPERIMENT 3

With respect to each of the same samples as in Experiment 1, the dimensional change was measured by using a dilatometer, while the temperature was raised and lowered between room temperature and 1,000° C. At that time, the heating rate and the cooling rate were set at 2° C./min. As a result, it was found out that the dimensionally shrunk phenomenon occurred in the temperature range of 900° C. to 800° C. during cooling. Therefore, it is presumed that absorption of oxygen atoms and transfer of metallic atoms occurred.

EXPERIMENT 4

The same experimental samples as prepared in Experiment 1 were used, and their dimensional shrinkage rates in the heat cycling were measured, while the partial pressure of oxygen in the atmosphere was varied. More specifically, an experimental sample as prepared in Experiment 1 was placed in a box-shaped atmospheric furnace, and argon, oxygen and hydrogen were introduced into the furnace. The partial pressure of oxygen in the atmosphere was varied by adjusting the amounts of the respective gases to be fed into the furnace. The partial pressure of oxygen was measured by using a zirconia type oxygen sensor set at a cell temperature of 700° C.. Each sample was subjected to heat cycling at 10 times between 600° C. and 1,000° C.. The heating rate and the cooling rate in the temperature range of 600° C. to 1,000° C. was 2.5° C./min. or 12° C./min. In each heat cycle, the sample was kept at a constant temperature of each of 600° C. and 1,000° C. for 30 minutes. The dimensional shrinkage rate was calculated after the heat cycling. Results are shown in Table 3.

TABLE 3

| Sample No. | Partial pressure of oxygen in atmosphere (atm) | Dimensional shrinkage rate (%/10 times) | Heating rate & cooling rate (°C./min.) |
| --- | --- | --- | --- |
| 4-1 | $2 \times 10^{-1}$ | 0.29 | 2.5 |
| 4-2 | $1 \times 10^{-17}$ | — | 2.5 |
| 4-3 | $1 \times 10^{-1}$ | 0.18 | 2.5 |
| 4-4 | $7 \times 10^{-2}$ | 0.15 | 2.5 |
| 4-5 | $1 \times 10^{-2}$ | 0.08 | 2.5 |
| 4-6 | $1 \times 10^{-5}$ | 0.02 | 2.5 |
| 4-7 | $3 \times 10^{-15}$ | 0.01 | 2.5 |
| 4-8 | $2 \times 10^{-1}$ | 0.07 | 12 |
| 4-9 | $1 \times 10^{-1}$ | 0.04 | 12 |
| 4-10 | $7 \times 10^{-2}$ | 0.03 | 12 |
| 4-11 | $1 \times 10^{-2}$ | 0.01 | 12 |
| 4-12 | $1 \times 10^{-5}$ | 0.01 | 12 |
| 4-13 | $3 \times 10^{-15}$ | 0.00 | 12 |

In Sample 4-1 falling outside the scope of the present invention, the dimensional shrinkage rate is far greater as compared with Samples 4-3 through 4-7 according to the present invention. The dimensional shrinkage rate of Sample 4-3 is far smaller than that of Sample 4-1. In Samples 4-5, 4-6 and 4-7, the average dimensional shrinkage rate from the first to tenth heat cycles is not more than 0.01% per one heat cycle.

Further, more excellent effects could be obtained when the heating rate and the cooling rate were set at 12° C./min. In Samples 4-11, 4-12 and 4-13, the dimensional shrinkage per one heat cycle was suppressed to almost zero.

EXPERIMENT 5

With respect to each sample in Experiment 1, the temperature was raised from room temperature to 1,000° C., kept at 1,000° C. for 10 hours, and cooled to room temperature. The heating rate and the cooling rate were set at 2.5° C./min, and the partial pressure of oxygen in the atmosphere was set at $2 \times 10^{-1}$ atm. The dimensional change rate between before and after the firing was measured, which revealed 0.03% shrinkage. On the other hand, it is seen from Table 3 that the dimensional shrinkage rate in the heat cycling by 10 times after the firing was 0.029% per one heat cycle. Therefore, the shrinkage of 0.03% substantially corresponds to the dimensional shrinkage rate per one heat cycle. From the these results, it is considered that the dimensional shrinkage of 0.03% occurred not when the sample was held at 1,000° C. but when the sample was cooled from 1,000° C. to room temperature. In other words, the dimensionally shrunk phenomenon that the sample or the air electrode experience during the heat cycling is caused by a mechanism quite different from a mechanism by which the air electrode is sintered by holding it at high temperatures.

As mentioned above, according to the present invention, even when the air electrode made of the lanthanum manganite porous sintered body is subjected to the heat cycling, no dimensional shrinkage of the air electrode due to the heat cycling can be suppressed.

That is, when the power generator, in which the solid oxide fuel cell is used as a power-generating element and the air electrode of the solid oxide fuel cell, is composed of lanthanum manganite is operated by setting the heating rate and the cooling rate at least in the temperature range from 600° C. to 900° C. at not less than 3° C./min. in the case that the fuel cell is heated up to an operating temperature at the time of starting the power generator and in the case that the fuel cell is cooled from the operating temperature at the time of stopping the power generator, no cracks occur between the air electrode and the other constituent elements of the fuel cell. Therefore, long service life of the power generator can be assured by the operating process of the invention.

What is claimed is:

1. A method for operating a power generator in which a solid oxide fuel cell is used as a power-generating element and an air electrode of said solid oxide fuel cell is composed of lanthanum manganite, said method comprising the step of setting a heating rate and a cooling rate at least in a temperature range of 600° C. to 1,000° C. at not less than 3° C./min. when the fuel cell is heated up to an operating temperature at the time of starting the power generator and when the fuel cell is cooled from the operating temperature at the time of stopping the power generator.

2. The method of claim 1, wherein said heating rate and said cooling rate are set at not more than 15° C./min.

3. The method of claim 2, wherein a heating rate and a cooling rate at least in the temperature range of 800° C. to 900° C. are set at not less than 3° C./min. and not more than 15° C./min.

4. The method of claim 1, wherein said air electrode is a support body of said solid oxide fuel cell.

5. The method of claim 4, wherein said air electrode has a cylindrical shape.

6. A method for operating a power generator in which a solid oxide fuel cell is used as a power-generating element and an air electrode of said solid oxide fuel cell is composed of lanthanum manganite, said method comprising the step of setting a partial pressure of oxygen, at least in a temperature range of 600° C. to 1,000° C. in an atmosphere to which said air electrode is exposed, at not less than $10^{-15}$ atms and not more than $10^{-1}$ atms when the fuel cell is heated up to an operating temperature at the time of starting the power generator and when the fuel cell is cooled from the operating temperature at the time of stopping the power generator.

7. The method of claim 6, wherein said partial pressure of oxygen at least in the temperature range of 800° C. to 900° C. is not less than $10^{-15}$ atm and not more than $10^{-1}$ atm.

8. The method of claim 6, wherein said air electrode also functions as a support body of said solid oxide fuel cell.

9. The power method of claim 8, wherein said air electrode has a cylindrical shape.

* * * * *